S. T. RUNYON.
SIGNALING DEVICE.
APPLICATION FILED OCT. 28, 1914.

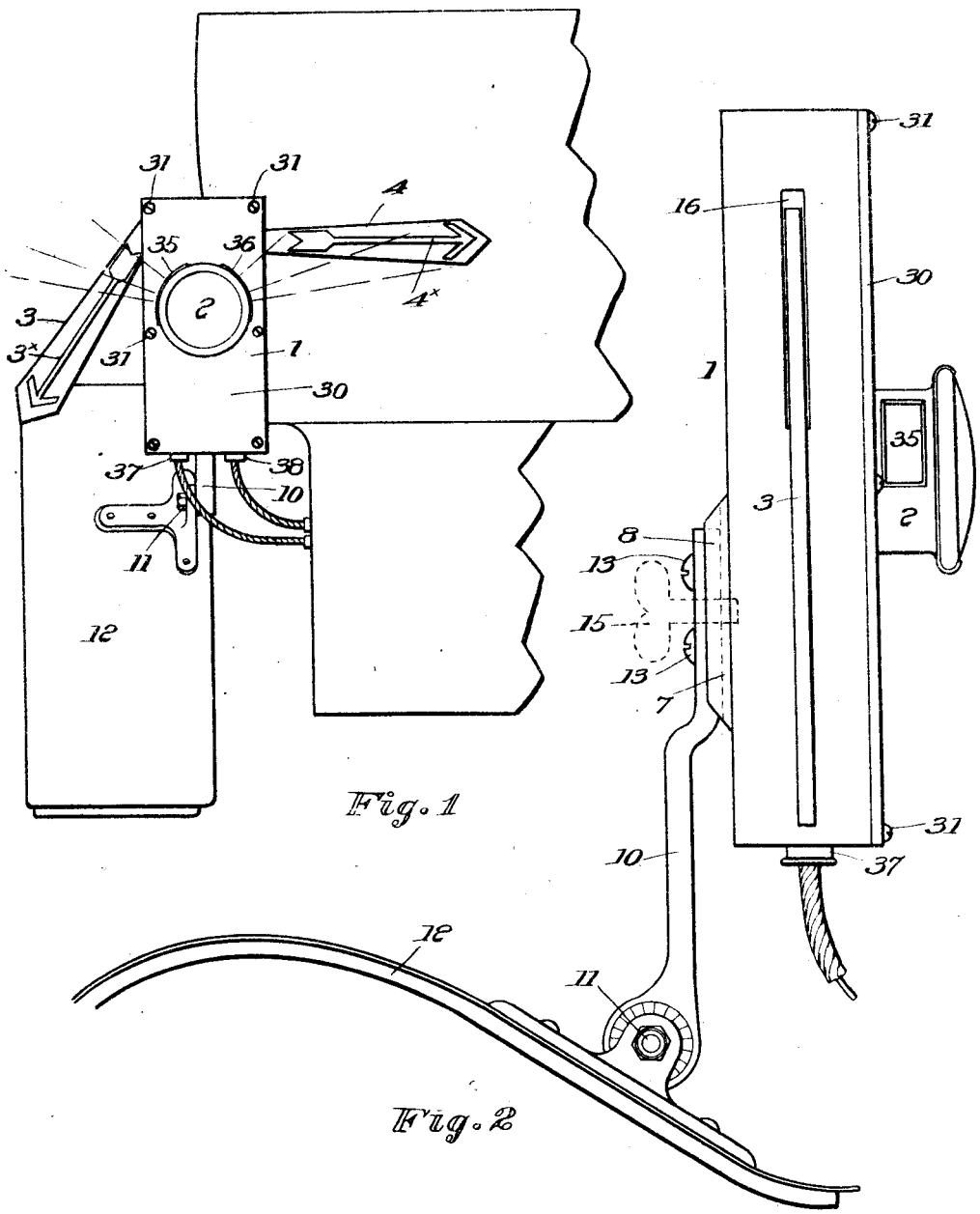

1,191,478.

Patented July 18, 1916.
2 SHEETS—SHEET 2.

WITNESSES:
Alan Franklin
P. S. Picault

INVENTOR.
Stanley T. Runyon
BY John A. Miller
ATTORNEY.

UNITED STATES PATENT OFFICE.

STANLEY T. RUNYON, OF SAN FRANCISCO, CALIFORNIA.

SIGNALING DEVICE.

1,191,478.  Specification of Letters Patent.  Patented July 18, 1916.

Application filed October 28, 1914. Serial No. 868,998.

*To all whom it may concern:*

Be it known that I, STANLEY T. RUNYON, a citizen of the United States, and a resident of the city and county of San Francisco, State of California, have made a new and useful invention, to wit, a Signaling Device; and I do hereby declare the following to be a full, clear, concise, and exact description thereof.

This invention is an improved signaling device particularly adapted for use on a motor vehicle to indicate when the vehicle is about to turn to one side or the other or about to stop.

In this specification and the annexed drawings I illustrate the invention in the form which I consider the best, but it is to be understood that I do not limit myself to such form because the invention may be embodied in other forms, and it is also to be understood that in and by the claims following the description herein, I intend to cover the invention in whatever form it may be embodied.

Figure 3:
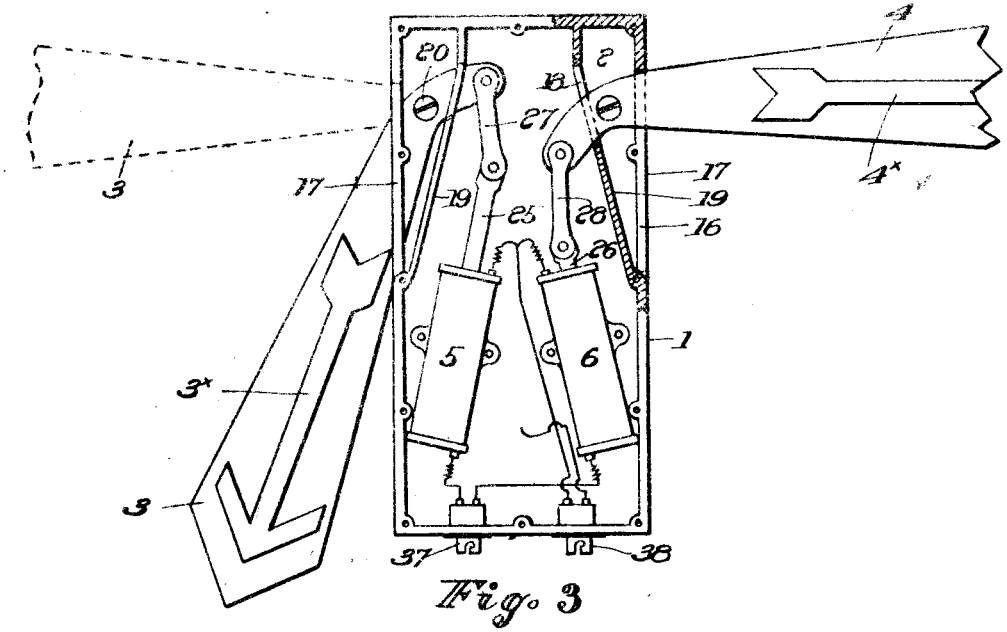
Figure 4:
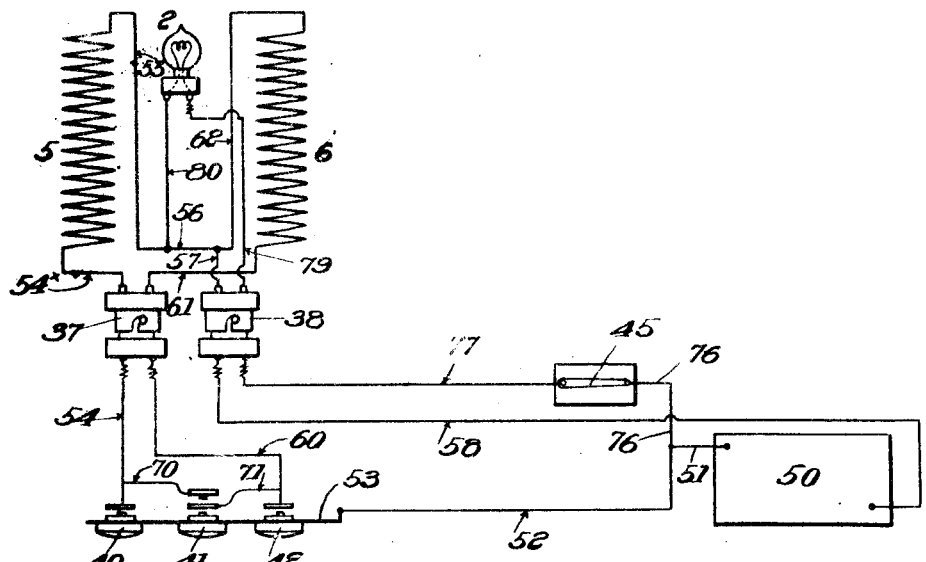

Referring to the drawings accompanying this specification and annexed thereto, Figure 1 is a view illustrating a portion of the rear of an automobile and my improved signaling device attached thereto. Fig. 2 is an enlarged side elevation of the signaling device, a portion of the automobile wheel guard, and the bracket attaching the signaling device to the guard. Fig. 3 is a front view of the signaling device, with the front plate and light removed to illustrate the semaphore arm-operating-mechanism. Fig. 4 is a diagram of the electrical circuit controlling the operation of the device.

In the drawings I illustrate a casing 1 upon which is mounted an automobile tail lamp 2 and within which are mounted semaphore arms 3 and 4 and solenoids 5 and 6 for operating the semaphore arms in the manner hereinafter described. An embossment 7 is provided on the casing, on which embossment are flanges 8, between which flanges is adapted to fit the upper end of the ordinary automobile tail light bracket 10, which bracket is adjustably connected at 11 at its lower end to the automobile wheel guard 12 in the usual manner, and is secured to the casing embossment 7 by the usual screws 13, whereby the signaling device is maintained in position at the rear of the automobile. If desirable it may be secured to the upper end of the bracket 10 by a set screw 15, shown in dotted lines Fig. 2, which may also extend through the bracket and into the embossment. One end of each of the semaphore arms 3 and 4 extends within the casing 1 through a slot 16 in one side wall 17 of the casing and through a slot 18 in an inclined wall 19. The arms 3 and 4 are respectively fulcrumed at 20 between a side wall 17 and an inclined wall 19. The walls 19 incline downwardly from the top wall of the casing to the side walls 17 and meet the side walls below the lower ends of the slots 16 so that they divert any water or dust which may enter the casing through the slots 16, out of the casing through the lower ends of said slots. The inner extremities of the arms 3 and 4 are respectively connected to the cores 25 and 26 of solenoids 5 and 6 by links 27 and 28. The tail light 2 is secured to the rear wall 30 of the casing 1, which wall is detachably secured to the side and end walls of the casing by screws 31 so that said light is removable with the rear wall. Side lenses 35 and 36 are provided on the lamp 2 through which are adapted to project rays of light from the lamp onto the semaphore arms 3 and 4 when the arms are in horizontal or signaling position, so that one may see the semaphore arms in signaling at night.

The signal lamp circuit wires are brought into the casing 1 through the socket connections 37 and 38, which may be disconnected so as to readily remove the signal when desired. Arrows $3^x$ and $4^x$ or any other indicia may be placed on the arms 3 and 4 to aid in reading the signal.

The signaling device is preferably electrically controlled as illustrated in the diagram in Fig. 4 of the drawings, but I do not limit myself to this form of control.

As shown in the diagram the signal circuit is controlled by a button switch comprising three switch buttons 40, 41 and 42, but instead of the button switches any other form of switch may be used. The lamp circuit is controlled by a switch 45. Said switches may be located at a point on the automobile convenient to the driver so that he may operate the signaling device upon making a maneuver of the automobile. An electric current is supplied through the signal and lamp circuits by a generator 50.

When the driver of the automobile intends to turn to the left, he may indicate this maneuver with the signal upon pressing switch button 40. Upon pressing said button the circuit controlling the solenoid 5 is closed and current flows from the generator 50 through wires 51, 52, switch plate 53, button switch 40, wire 54, connection 37, wire 54ˣ, the coil solenoid 5, wires 55, 56, 57, connection 38, wire 58, to generator 50. As the current passes through the coil of solenoid 5, the core 25 is drawn down and, through the medium of the link 27, the core swings semaphore arm 3 on its fulcrum into horizontal or signaling position as indicated in Fig. 3 of the drawing in dotted lines. The horizontal position of said arm indicates that the automobile will turn to the left.

When the driver intends to turn to the right, he may indicate this maneuver with the signal upon pressing button 42. Upon pressing said button, the circuit controlling the solenoid 6 is closed, and current flows from the generator 50 through wires 51, 52, switch plate 53, button 42, wire 60, connection 37, wire 61, coil of solenoid 6, wires 62, 56 and 57, connection 38 and wire 58 to generator. As the current passes through the coil of solenoid 6, the core 26 is drawn down and through the medium of the link 28, the core swings the semaphore arm 4 on its fulcrum into horizontal or signaling position as shown in Figs. 1 and 3 of the drawings. Such position of the arm 4 indicates that the automobile will turn to the right.

When the driver intends to stop the automobile, he may indicate this with the signal upon pressing the button 41. Upon pressing said button, the circuits controlling the two solenoids 5 and 6 are closed. Current then passes from generator 50 through wires 51 and 52, switch plate 53, switch button 41, simultaneously through wires 70 and 71, wires 54 and 60, connection 37, wires 54ˣ and 61, 55 and 62, wires 56 and 57, connection 38, wire 58 to generator. As current simultaneously passes through the coils of the solenoids 5 and 6, the solenoid cores 25 and 26 and links 27 and 28 are drawn down and the two semaphore arms 3 and 4 are swung simultaneously into horizontal and signaling position as shown in Fig. 3 of the drawing, the arm 4 being shown in full lines and the arm 3 in dotted lines. The horizontal position of both arms together indicates that the automobile will stop.

When the switch 45 is closed current passes from generator through wires 51 and 76, switch 45, wire 77, connection 38, wire 79, lamp 2, lighting the lamp, then through wires 80, 56 and 57, connection 38 and wire 58 to generator.

I do not limit myself to the exact disclosure herein set forth as it is obvious that variations and modifications of the invention may be made without departing from the spirit of the invention. Moreover, I do not limit the use of the signal to automobiles or vehicles as it could be used to advantage for other purposes, such for instance as a railroad signal.

I claim:

1. In a vehicle signaling device, a casing provided with a slot, a semaphore arm extending through said slot into the casing, means within said casing for actuating said arm, and an inclined wall extending to a point at the lower end of said slot to divert water or dust out of the casing through said slot.

2. In a vehicle signaling device a casing provided with a slot, signaling means operating within said casing and projecting outwardly through said slot and an inclined wall extending to a point at the lower end of said slot to divert water or dust out of said casing through the slot.

In testimony whereof, I have hereunto set my hand at San Francisco, California, this 21st day of October, 1914.

STANLEY T. RUNYON.

In presence of—
ALAN FRANKLIN,
JOHN R. OBER.